United States Patent
Hasbe et al.

(10) Patent No.: US 11,922,199 B2
(45) Date of Patent: Mar. 5, 2024

(54) ASSOCIATING SECURITY TAGS TO CONTINUOUS DATA PROTECTION CHECKPOINTS/SNAPSHOTS/POINT-IN-TIME IMAGES

(71) Applicant: VMWARE, INC., Palo Alto, CA (US)

(72) Inventors: Sunil Hasbe, Pune (IN); Shirish Vijayvargiya, Pune (IN)

(73) Assignee: VMware, Inc., Palo Alto, CA (US)

( * ) Notice: Subject to any disclaimer, the term of this patent is extended or adjusted under 35 U.S.C. 154(b) by 283 days.

(21) Appl. No.: 16/805,873

(22) Filed: Mar. 2, 2020

(65) Prior Publication Data

US 2021/0173689 A1    Jun. 10, 2021

(30) Foreign Application Priority Data

Dec. 10, 2019    (IN) .............................. 201941050995

(51) Int. Cl.
  *G06F 9/455*    (2018.01)
  *G06F 11/14*    (2006.01)
  *G06F 21/56*    (2013.01)

(52) U.S. Cl.
  CPC ...... *G06F 9/45558* (2013.01); *G06F 11/1469* (2013.01); *G06F 11/1484* (2013.01); *G06F 21/566* (2013.01); *G06F 21/568* (2013.01); *G06F 2009/45562* (2013.01); *G06F 2009/45575* (2013.01); *G06F 2201/815* (2013.01); *G06F 2201/84* (2013.01)

(58) Field of Classification Search
  CPC ............ G06F 8/63; G06F 2009/45562; G06F 2009/45587; G06F 21/568; G06F 11/1469; G06F 21/53; G06F 21/566; G06F 2201/84; G06F 9/45558; G06F 11/1484; G06F 21/54; G06F 2009/45575; G06F 2201/815
  USPC .................................................. 711/162, 161
  See application file for complete search history.

(56) References Cited

U.S. PATENT DOCUMENTS

| | | | |
|---|---|---|---|
| 8,893,279 B1* | 11/2014 | Chandrasekhar | G06F 21/562 726/24 |
| 10,552,610 B1* | 2/2020 | Vashisht | G06F 3/0619 |
| 2008/0263658 A1* | 10/2008 | Michael | G06F 21/562 726/22 |
| 2010/0043073 A1* | 2/2010 | Kuwamura | G06F 21/56 718/1 |
| 2017/0093890 A1* | 3/2017 | Natanzon | G06F 16/27 |

\* cited by examiner

*Primary Examiner* — David Yi
*Assistant Examiner* — Zubair Ahmed
(74) *Attorney, Agent, or Firm* — King Intellectual Asset Management (57) ABSTRACT

An in-guest agent in a virtual machine (VM) operates in conjunction with a replication module. The replication module performs continuous data protection (CDP) by saving images of the VM as checkpoints at a disaster recovery site over time. Concurrently, the in-guest agent monitors for behavior in the VM that may be indicative of the presence of malicious code. If the in-guest agent identifies behavior (at a particular point in time) at the VM that may be indicative of the presence of malicious code, the replication module can tag a checkpoint that corresponds to the same particular point in time as a security risk. One or more checkpoints generated prior to the particular time may be determined to be secure checkpoints that are usable for restoration of the VM.

21 Claims, 3 Drawing Sheets

Fig. 3

ASSOCIATING SECURITY TAGS TO CONTINUOUS DATA PROTECTION CHECKPOINTS/SNAPSHOTS/POINT-IN-TIME IMAGES

RELATED APPLICATIONS

Benefit is claimed under 35 U.S.C. 119(a)-(d) to Foreign Application Serial No. 201941050995 filed in India entitled "ASSOCIATING SECURITY TAGS TO CONTINUOUS DATA PROTECTION CHECKPOINTS/SNAPSHOTS/POINT-IN-TIME IMAGES", on Dec. 10, 2019, by VMware, Inc., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

To protect against a potential disaster (e.g., data loss/corruption in the VMs and/or hosts) caused by certain types of events (e.g., power or network outages, system malfunctions, etc.), virtualized computing environments typically implement replication solution. Replication solutions provide continuous data protection (CDP) by repeatedly saving an image or snapshot of a VM at a remote disaster recovery (DR) site as checkpoints (e.g., point-in-time images). For example, data may be moved from the VM to the DR site at regular time intervals or whenever the data is modified in the VM. In the event of a data corruption or data loss situation, a system administrator can select any of the checkpoints in the DR site, and then restart the VM at the DR site using the selected checkpoint (point-in-time image).

A virtualized computing environment having hosts that support VMs is often vulnerable to malware, viruses, or other types of malicious code. An issue with replication solutions is that in the event of a virus attack, the replication solutions may not be able to provide good and secure checkpoints on the DR site. For example, during the routine course of replicating images as the checkpoints at the DR site, one or more of the checkpoints themselves may be infected by a virus. In order to ensure that the VM is not restored with an infected image, the system administrator typically needs to first launch each and every checkpoint for purposes of applying a virus scan to the checkpoints to determine the validity/security of the checkpoints, prior to deploying the checkpoint(s) in the VM. Having to launch each and every checkpoint and running the virus scan on these checkpoints result in an increase in the recovery time objective (RTO) time and application downtime.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks in replication solutions, by providing an in-guest agent in a VM that operates in conjunction with a replication module. The replication module performs CDP by saving images of the VM as checkpoints at a DR site over time. Concurrently in a time-synchronized manner, the in-guest agent monitors for behavior in the VM that may be indicative of the presence of malicious code (e.g., a virus, etc.). If the in-guest agent identifies behavior (at a particular point in time) at the VM that may be indicative of the presence of malicious code, the replication module can tag a checkpoint that corresponds to the same particular point in time as an unsecure image with a security risk (e.g., the checkpoint is tagged as being infected, corrupted, quarantined, vulnerable, etc.). That checkpoint (and subsequent checkpoints in time) in turn can be discarded and/or further investigated (e.g., by applying a virus scan) to determine the appropriate remedial action. Other checkpoints that were created prior to the particular point in time and which correspond to behavior by the VM that was validated (e.g., not identified as being indicative of malicious code) by the in-guest agent can be deemed as being secure, and can be used to launch the VM if there is a need for disaster recovery.

Computing Environment

To further explain the operation of the in-guest agent to perform a monitoring process and the operation of the replication module to perform a replication process in cooperation and synchronization with each other, various implementations will now be explained in more detail using FIG. 1, which is a schematic diagram illustrating an example virtualized computing environment 100 that can implement a method to associate security tags to CDP checkpoints. Depending on the desired implementation, virtualized computing environment 100 may include additional and/or alternative components than that shown in FIG. 1.

Figure 1:
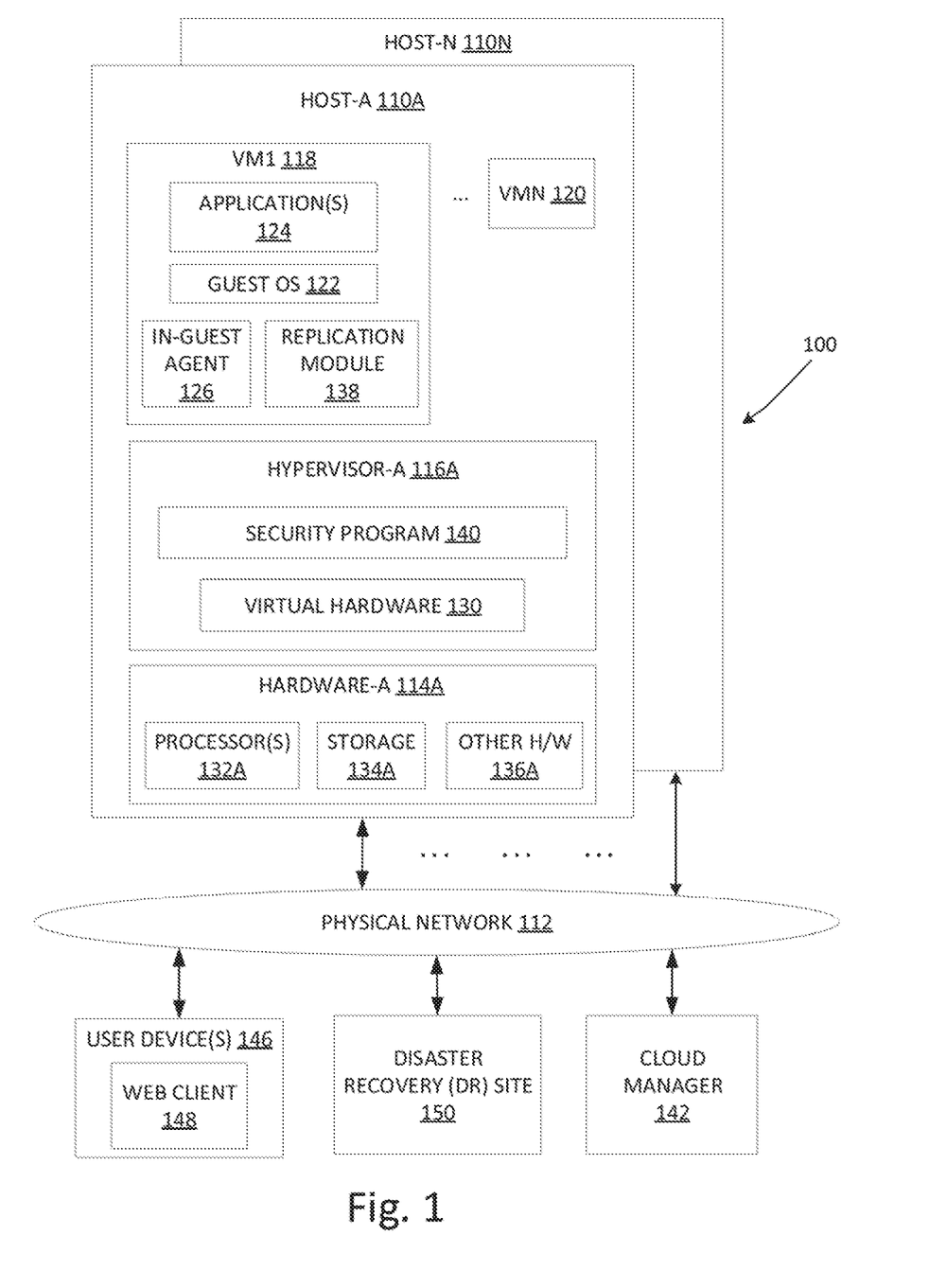
FIG. 1 is a schematic diagram illustrating an example virtualized computing environment that can implement a method to associate security tags to CDP checkpoints.

In the example in FIG. 1, the virtualized computing environment 100 includes multiple hosts, such as host-A 110A host-N 110N that may be inter-connected via a physical network 112, such as represented in FIG. 1 by interconnecting arrows between the physical network 112 and host-A 110A host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other host-N 110N can include substantially similar elements and features.

The host-A 110A includes suitable hardware 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 is shown and described herein.

VM1 118 may be a guest VM that includes a guest operating system (OS) 122 and one or more guest applications 124 (and their corresponding processes) that run on top of the guest operating system 122. VM1 118 may also include an agent 126 (in-guest agent). The agent 126 of various embodiments may be in the form of a daemon or other software/code that runs in a background process. The agent 126 may run as part of the guest OS 122 in one example implementation. The agent 126 may first run in a learning mode for a period of time, in which the agent 126 monitors the operation of VM1 118 in order to generate a whitelist of expected operational behavior of VM1 118, such as valid operations and tasks that are executed by VM1 118 under normal/routine circumstances. The agent 126 may then run in a protected mode to monitor VM1 118 to ensure that operations/tasks performed by VM1 118 are present in the whitelist—the agent 126 validates operations that are found on the whitelist, and creates an alarm for operations that violate the whitelist (e.g., operations that are not present on the whitelist or are modifications of valid operations on the whitelist). Further details of the features and operation of the agent 126 will be described later below with respect to FIGS. 2-3.

VM1 118 may also include a replication module 138 that is configured to perform continuous data protection (CDP), by copying data of VM1 118 to a disaster recovery (DR) site 150. For example, the replication module 138 may save images/snapshots of VM1 118 as checkpoints that are stored in the DR site 150. The replication module 138 (as well as the agent 126) of one embodiment may be any suitable software program or other computer-readable instructions/code stored on a non-transitory computer-readable medium, and executable by one or more processors. Further details of the features and operation of the replication module 138 will be described later below with respect to FIGS. 2-3.

The hypervisor 116A may be a software layer or component that supports the execution of multiple virtualized computing instances. The hypervisor 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the applications 124 (e.g., a word processing application, accounting software, a browser, etc.) in VM1 118. Corresponding to the hardware 114A, the virtual hardware 130 may include a virtual CPU, a virtual memory, a virtual disk, a virtual network interface controller (VNIC), etc.

A security program 140 may run on top of or within the hypervisor-A 116A. In the example embodiment of FIG. 1, the security program 140 is depicted as running within or as part of the hypervisor-A 116A. In other embodiments, the security program 140 may run within or may be installed at other locations within the host-A 110A. The security program 140 may be configured in one embodiment to receive alerts from the agent 126 about possible malicious code, and to take a remedial action in response to an alert from the agent 126. For example, the security program 140 may take remedial actions such as shutting down VM1 118, disabling the guest OS 122, sending a report or forwarding the alert to a cloud manager 142 so as to enable a system administrator to further evaluate the alert(s) from the agent 126, etc. In some embodiments, the agent 126 can be part of the security program 140.

Although FIG. 1 shows the security program 140 as a single discrete component, the security program 140 of another embodiment can be implemented using distributed components that include or otherwise work in conjunction with the agent 126, the cloud manager 142, and the replication module 138.

The cloud manager 142 of one embodiment can take the form of a physical computer with functionality to manage or otherwise control the operation of host-A 110A . . . host-N 110N. In some embodiments, the functionality of the cloud manager 142 can be implemented in a virtual appliance, for example in the form of a single-purpose VM that may be run on one of the hosts in a cluster or on a host that is not in the cluster. The functionality of the cloud manager 142 may be accessed via one or more user devices 146 that are operated by a system administrator. For example, the user device 146 may include a web client 148 (such as a browser-based application) that provides a user interface operable by the system administrator to view and evaluate alerts provided by the agent 126 to the cloud manager 142. The system administrator may then operate the user interface of the web client 148 to facilitate the implementation of a remediation action, such as shutting down a VM, disabling a guest OS, debugging, troubleshooting, etc.

The cloud manager 142 may be communicatively coupled to host-A 110A host-N 110N (and hence communicatively coupled to the virtual machines, hypervisors, agents, hardware, etc.) via the physical network 112. The host-A 110A host-N 110N may in turn be configured as a datacenter that is managed by the cloud manager 142, and the datacenter may support a web site. In some embodiments, the functionality of the cloud manager 142 may be implemented in any of host-A 110A host-N 110N, instead of being provided as a separate standalone device such as depicted in FIG. 1.

The DR site 150 can be a remote storage location (such as a cloud-based site) that includes physical machines and/or virtual machines that are configured to store images/snapshots of VM1 118 . . . VMN 120 as checkpoints (point-in-time images). The DR site 150 can also store any other data or portion thereof provided by the replication module 138. In some embodiments, new VMs can be launched from the DR site 150 (using a selected checkpoint) so as to replace one or more of VM1 118 . . . VMN 120 that may have become infected or corrupted or has crashed etc. In other embodiments, the selected checkpoint can be downloaded from the DR site 150 for installation/relaunching in one or more of VM1 118 . . . VMN 120, so as to replace data in the VM(s) that may have become corrupted, lost, or infected.

Depending on various implementations, one or more of the physical network 112, the cloud manager 142, the DR site 150, and the user device(s) 146 can comprise parts of the virtualized computing environment 100, or one or more of these elements can be external to the virtualized computing environment 100 and configured to be communicatively coupled to the virtualized computing environment 100.

Monitoring and Replication Processes

Figure 2:
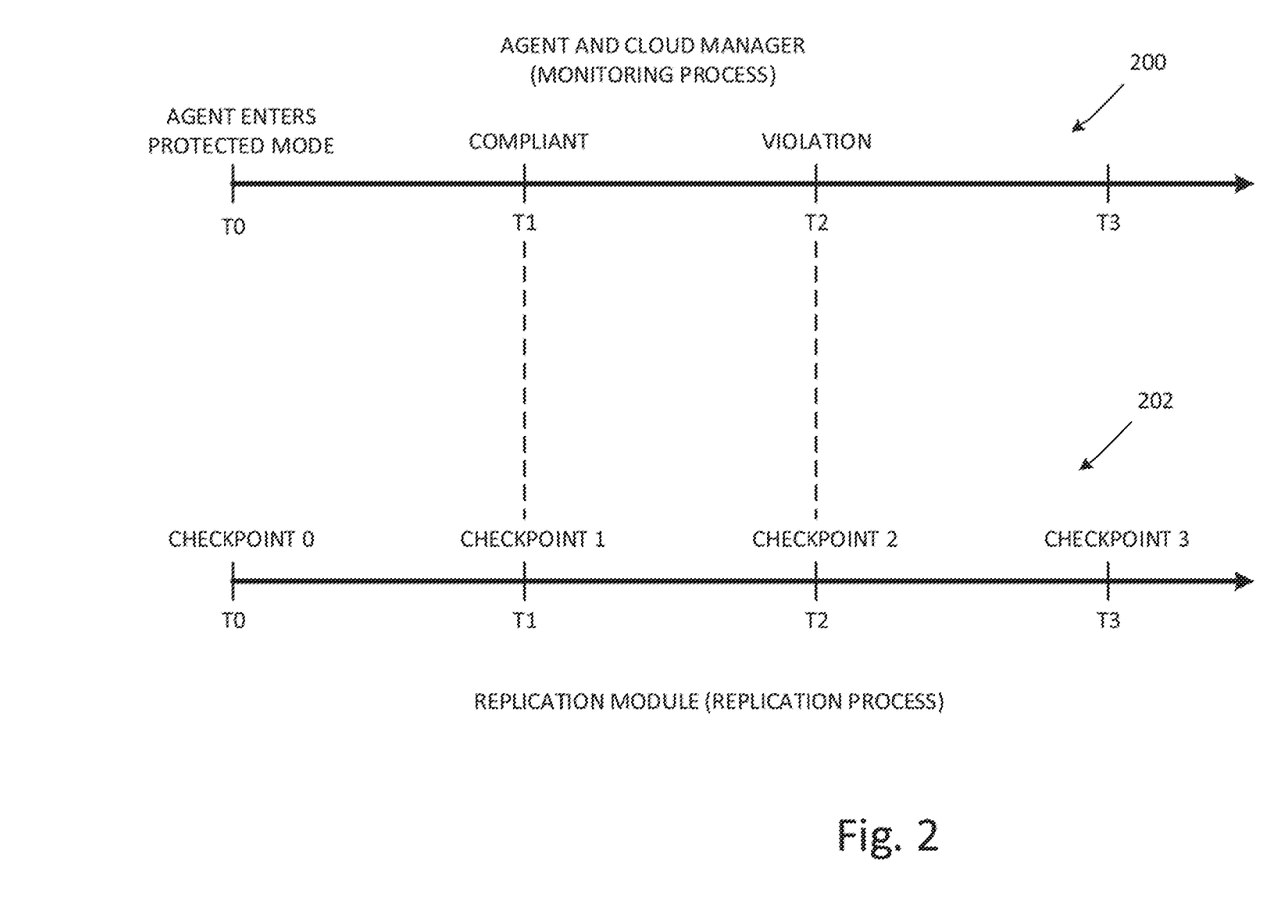
FIG. 2 is a diagram illustrating synchronization and cooperation between a monitoring process and a replication process for the virtualized computing environment of FIG. 1.

FIG. 2 is a diagram illustrating synchronization and cooperation between a monitoring process and a replication process for the virtualized computing environment 100 of FIG. 1. Specifically, a diagram 200 represents example events that occur over time during a monitoring process performed by the agent 126 in conjunction with the cloud manager 142. A diagram 202 represents example events that occur over the same time during a replication process performed by the replication module 138. The diagrams 200 and 203 have the same aligned time scale, with particular points of times generally denoted as T0, T1, T2, T3, etc. The time durations between T0 and T1, between T1 and T2, etc. need not be uniform relative to each other. Such time durations can be in seconds or less, in minutes, in hours, in days, etc., or combination thereof.

Referring first to the diagram 200, the agent 126 completes the learning mode and enters the monitoring mode at T0. For instance, the agent 126 has completed the whitelist of expected operational behavior (listing of valid operations that can be performed by VM1 118), and enters the protected mode at T0 so as to monitor/compare operations performed by VM1 118 against the whitelist. Operations that are compliant with the whitelist are deemed to be valid, while operations that are missing from the whitelist or are a modification of operations permitted by the whitelist are deemed to be violations, which in turn invokes further investigation by the cloud manager 142 to verify whether there is a security issue (e.g., malware infection).

Next, the agent 126 determines that one or more operations performed by VM1 118 at T1 are compliant with the whitelist, and are thus valid. In some embodiments, the agent 126 may send report information to the cloud manager 142 (via the security program 140) to enable the cloud manager 142 to identify T1 as a particular point in time (e.g., via a date and time stamp) when VM1 118 was verified to have executed valid operations (and hence is in a secure state). In other embodiments, the agent 126 does not send any report information to the cloud manager 142 in situations wherein the agent 126 verifies that VM1 118 has executed valid operations—rather, the agent 126 sends report information (such as an alarm) to the cloud manager 142 only in situations when a violation of the whitelist is detected (and so the VM may be in an insecure state).

The agent 126 determines that VM1 118 has performed one or more operations at T2 that are a violation of the whitelist. As will be described in further detail below with respect to FIG. 3, this detection of the violation results in a number of actions, such as sending an alarm to the cloud manager 142, verifying by the cloud manager 142 that the operation(s) at T2 are indicative of malicious code, sending an instruction by the cloud manager 142 to the guest agent 126 and/or to the security program 140 to perform a remedial action, informing the replication module 138 of the violation at T2, tagging checkpoints generated at T2 and at subsequent times as vulnerable or quarantined or some other indication of a security risk (thereby identifying such checkpoints for actions such as discarding or virus scanning or other action to restrict the use of such checkpoints for restoration), etc.

Referring next to the diagram 202, the replication module 138 performs CDP to continuously save images or snapshots of VM1 118 to the DR site 150 over time, in the form of CDP checkpoints (point-in-time images). Four checkpoints (checkpoints 0-3) at T0-T3, respectively, are shown in in the diagram 202 by way of example. There may be any number of additional checkpoints between T0 and T1, between T1 and T2, etc., including checkpoints that are generated prior to T0 while the agent 126 is in the learning mode.

After the agent 126 informs the replication module 138 of the violation at T2, the replication agent 138 tags checkpoint 2 (which is in closest proximity to T2 or was generated at T2) as being vulnerable/quaranteed (or some other indication of a security risk). Any other checkpoint that is generated subsequent in time to checkpoint 2 (such as checkpoint 3) is also tagged by the replication module 138 as a possible security risk. These checkpoints can then be discarded from the DR site 150, or can be subject to virus scanning to determine their security risk. The cloud manager 142 and/or the replication module 138 can control the discarding and virus checking. Thus, checkpoint 2 and the subsequent checkpoints can be prevented or otherwise restricted from being used when restoring VM1 118, and checkpoints generated subsequent to T2 can be used instead for restoration.

For example, the cloud manager 142 can use checkpoint 1 (which was generated in closest proximity to T1) as the basis for relaunching VM1 118, since checkpoint 1 was generated prior to the violation at T2 and also corresponds to the determination by the agent 126 that VM1 118 performed compliant operations at T1.

Having learned (from the replication agent 138) that checkpoint 2 is a security risk, the cloud manager 142 of one embodiment can use report information (e.g., date and time stamp information and compliance verification) from the agent 126 to identify the previous-in-time checkpoint 1 as a secure checkpoint. Checkpoint 1 can then be used for relaunching VM1 118 (including installing into or otherwise restoring VM1 118).

In implementations when no such report information is available to the cloud manager 142 (e.g., the agent 126 does not generate report information for situations when compliance with the whitelist is verified—a report/alarm is generated only when there is a violation), the cloud manager 142 may use other techniques to identify checkpoint 1 as a secure checkpoint or to identify any other checkpoint generated prior to checkpoint 2 as a secure checkpoint. For example, the cloud manager 142 can run a virus scan in sequence on each checkpoint generated prior to checkpoint 2 (starting at a checkpoint that is generated from just before T2 and moving in reverse order in time through each checkpoint), until a first secure checkpoint is identified. Such identified secure checkpoint may be checkpoint 1 or some other checkpoint between T1 and T2. Such approach is different from and advantageous over the conventional techniques discussed above that need to perform virus scanning on each and every checkpoint. For example, such approach is able to eliminate the time and effort to perform virus scanning on checkpoint 2 and subsequent checkpoints that are tagged as security risks, and such approach is also able to identify T2 as a starting point and therefore can focus the virus scanning on checkpoints generated before T2. A net result is a reduced number of checkpoints that are scanned for viruses, thereby providing a decreased RTO and other decreased downtime.

Figure 3:
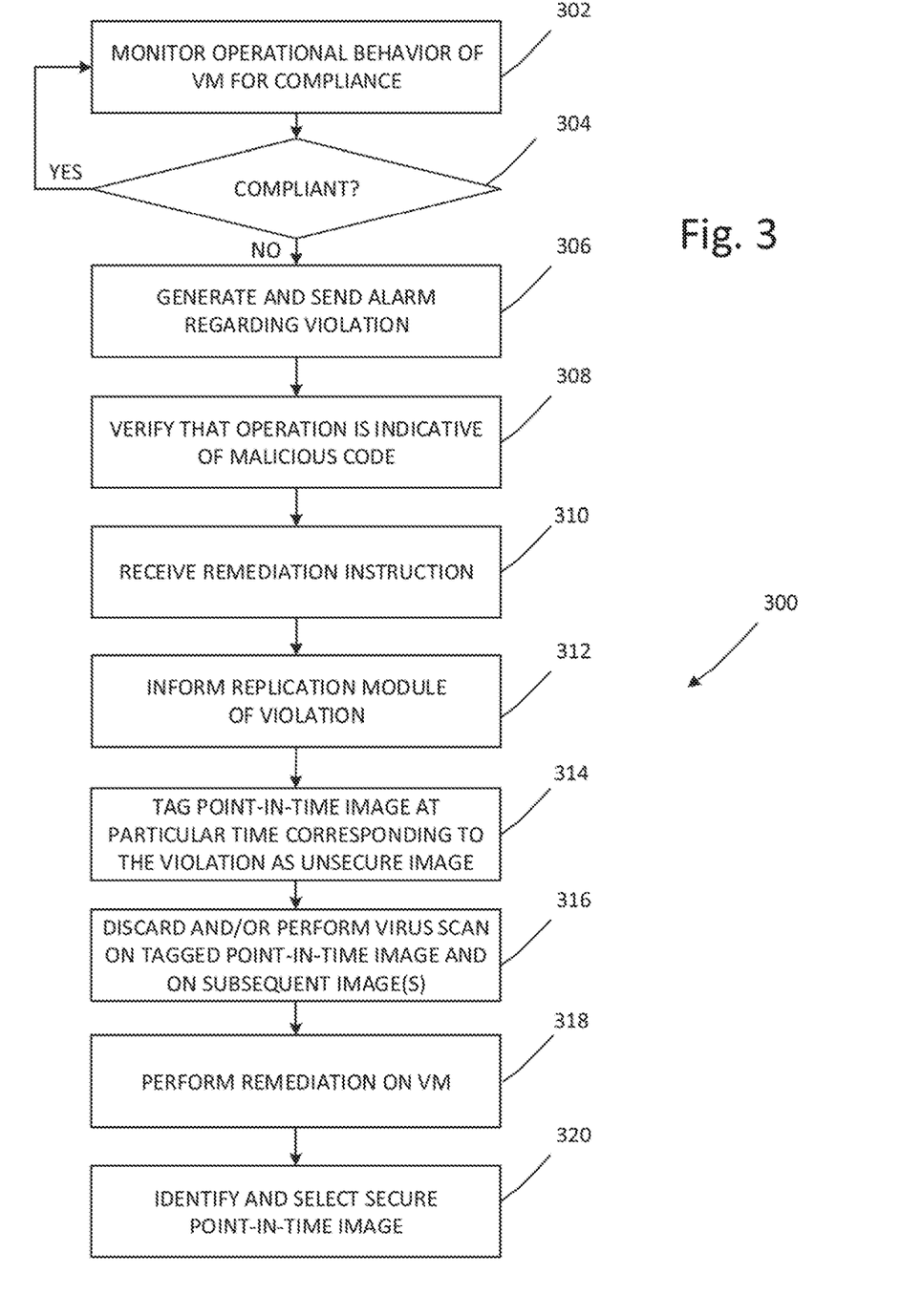
FIG. 3 is a flowchart of an example method that can be performed in the virtualized computing environment of FIG. 1 to associate security tags to CDP checkpoints.

Further details about the monitoring and replication processes are described next with respect to FIG. 3. Specifically, FIG. 3 is a flowchart of an example method 300 that can be performed in the virtualized computing environment 100 of FIG. 1 to associate security tags to CDP checkpoints. The example method 300 may include one or more operations, functions, or actions illustrated by one or more blocks, such as blocks 302 to 320. The various blocks of the method 300 and/or of any other process(es) described herein may be combined into fewer blocks, divided into additional blocks, supplemented with further blocks, and/or eliminated based upon the desired implementation. In one embodiment, the operations of the method 300 may be performed in a pipelined sequential manner. In other embodiments, some operations may be performed out-of-order, in parallel, etc.

According to one embodiment, some operations of the method 300 may be performed by the agent 126 (residing in host-A 110A), which may form part of the security program 140, in conjunction with the cloud manager 142. Some other operations of the method 300 may be performed by the replication module 138 also residing in host-A 110A. The operations in the method 300 are explained next below with reference to FIGS. 1 and 2.

At a block 302 ("MONITOR OPERATIONAL BEHAVIOR OF VM FOR COMPLIANCE"), the agent 126 is in the protected mode and is monitoring the operation(s) performed by VM1 118 by comparing such operation(s) against the expected operational behavior for VM1 118 (e.g., checking the operations against the whitelist). Before, during, and after the block 302, the replication module 138 is also generating point-in-time images (e.g., checkpoints) that are stored in the DR site 150.

At a block 304 ("COMPLIANT?"), the agent 126 determines whether one or more operations are compliant. For example, an operation performed at a particular time is compliant ("YES" at the block 304) if the operation is identified in the whitelist, and the method returns to the block 302 to continue monitoring. As previously explained above, the agent 126 may report the compliant activity to the cloud manager 142 in some embodiments, including reporting one or more of: the operations performed, a date/time that the operations are performed, or an indication that the operations are compliant, so that the cloud manager 142 can in turn specifically identify this particular time as corresponding to a secure state of VM1 118. Also as previously explained above, the agent 126 may not report compliant activity in some embodiments, and instead only report non-compliant activity (e.g., a violation of the whitelist).

For example, if the agent 126 determines that the operations are absent from the whitelist or are modifications of expected operational behavior, then the agent 126 determines that there is a violation due to non-compliance with the whitelist ("NO" at the block 304). This violation is indicative of the potential presence of malicious code in VM1 118, and so the agent 126 generates a report to send to the cloud manager 140 at a block 306 ("GENERATE AND SEND ALARM REGARDING VIOLATION"). The report generated and sent at the block 306 (which may be generated/sent via the security program 140 in some embodiments) may be in the form of an alarm that identifies one or more of: the operations performed or attempted to be performed, a date/time that the operations are performed or attempted to be performed, or an indication that the operations are non-compliant with the expected operational behavior indicated in the whitelist.

The block 306 may be followed by a block 308 ("VERIFY THAT OPERATION IS INDICATIVE OF MALICIOUS CODE") wherein the cloud manager 142 verifies whether VM1 118 is infected with malicious code. For example, in response to receiving the alarm (e.g., the report information) from the agent 126, the cloud manager 142 may create a point-in-time image of VM1 118 for the particular time when the violation occurred or was detected (e.g., T2 in FIG. 2), and then analyze the point-in-time image and other information to verify the presence of malicious code. In response to verification of the presence of the malicious code, the cloud manager 142 generates a remediation instruction, and sends the remediation instruction to the agent 126 (via the security program 140).

The block 308 may be followed by a block 310 ("RECEIVE REMEDIATION INSTRUCTION") in which the agent 126 and/or the security program 140 receives the remediation instruction from the cloud manager 142. For instance, the remediation instruction may instruct the security program 140 and/or the agent 126 to disable or erase VM1 118, so that VM1 118 can be later restored/relaunched at the DR site 150 or at the host-A 110A using a valid and secure point-in-time image. The remediation instruction may also be accompanied by information that indicates the date and time of the violation (e.g., T2 is provided in the remediation instruction).

The block 310 may be followed by a block 312 ("INFORM REPLICATION MODULE OF VIOLATION"), wherein in response to receiving the remediation instruction, the agent 126 and/or the security program 140 informs the replication module 138 that a violation of the whitelist occurred at a particular time (e.g., at T2). The replication module 138 then tags the point-in-time image that was generated at or in closest proximity to T2 (and the point-in-time images thereafter) as a security risk, at a block 314 ("TAG POINT-IN-TIME IMAGE AT PARTICULAR TIME CORRESPONDING TO THE VIOLATION AS AN UNSECURE IMAGE"). Tagging the point-in-time image can include, for instance, adding an annotation, flag, metadata, or some other indicia to the point-in-time image to identify the point-in-time image as an unsecure image with a security risk.

The block 314 may be followed by a block 316 ("DISCARD AND/OR PERFORM VIRUS SCAN ON TAGGED POINT-IN-TIME IMAGE AND ON SUBSEQUENT IMAGE(S)"), wherein the replication module 138 (and/or the cloud manager 142) can perform an action to discard the tagged point-in-time image and the subsequent images (e.g., at checkpoints 2, 3, etc. in FIG. 2), thereby preventing or otherwise restricting the use of the tagged point-in-time image for restoration of the VM. In some embodiments, the image(s) can be discarded without any further processing after being tagged. In this manner, processing load can be reduced, and the image(s) generated prior to the violation can simply be relied upon for restoration. In other embodiments, the cloud manager 142 can perform a virus scan on the tagged images(s) to verify the presence of malicious code—images that are verified to contain malicious code can be discarded, while images that are verified to be secure from malicious code can be retained, if appropriate, for use in restoration.

At a block 318 ("PERFORM REMEDIATION ON VM"), the agent 126 and/or some other component performs a remediation action on VM1 118, in response to receiving the remediation instruction from the cloud manager 142. The remediation action can include, for instance, disabling or erasing the VM, reinstalling/restoring/relaunching the VM, performing a virus scan on the VM, or performing some other action to identify and address (e.g., remove or disable) the source of the detected violation. In situations where a secure point-in-time image is needed at the block 318 in order to restore the VM, the cloud manager 142 or some component of the VM can identify and select a secure point-in-time image from the DR site 150, at a block 320 ("IDENTIFY AND SELECT SECURE POINT-IN-TIME IMAGE"). For example and as previously explained above with respect to FIG. 2, the secure point-in-time image can be the first point-in-time image immediately preceding T2 that is verified to be secure.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 2-3. For example, computing devices capable of acting as host devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to identify checkpoints that may have been compromised by malicious code and to validate other checkpoints that are secure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

What is claimed is:

1. A method for a host in a virtualized computing environment to restore a virtual machine supported by the host, the method comprising:
   performing, by a replication module resident in the virtual machine which runs on the host, a replication process during continuous data protection (CDP) to store point-in-time images of the virtual machine at a storage location over time while the virtual machine is running on the host, wherein the storage location is at a remote data recovery (DR) site that is external to the virtualized computing environment that includes the host;
   performing, by an agent resident in the virtual machine which runs on the host, a monitoring process concurrently and in synchronization with the replication process to monitor operational behavior of the virtual machine running on the host;
   in response to the monitored operational behavior at a particular time being determined by the agent as being in violation of expected operational behavior of the virtual machine, identifying, by the replication module resident in the virtual machine which runs on the host, a point-in-time image of the virtual machine that corresponds to the particular time as an unsecure image with a security risk;

performing, by the host, an action on the unsecure image to restrict use of the unsecure image for restoration of the virtual machine; and recovering, by the host from the storage location at the DR site, a point-in-time image of the virtual machine that was generated prior to the particular time and generated while the virtual machine was running on the host, that was stored at the storage location at the DR site by the replication process during CDP, and that was determined as being secure at the point-in-time of the generation of the image, to use for the restoration of the virtual machine.

2. The method of claim 1, wherein performing the action on the unsecure image includes at least one of: discarding the unsecure image or performing a virus scan on the unsecure image.

3. The method of claim 1, further comprising restricting use of at least one point-in-time image, generated after the unsecure image, for restoration of the virtual machine.

4. The method of claim 1, further comprising:

generating and sending to a manager, by the agent resident in the virtual machine which runs on the host, an alarm to indicate that the monitored operational behavior is in violation of the expected operational behavior; and receiving, by the host, a remediation instruction from the manager, in response to the manager having verified from at least the alarm that the virtual machine is infected with malicious code, wherein the point-in-time image is identified as the unsecure image based on the particular time which is indicated in the received remediation instruction.

5. The method of claim 1, wherein performing the monitoring process includes, comparing, by the agent resident in the virtual machine which runs on the host, one or more operations performed by the virtual machine against a whitelist for compliance with operations identified in the whitelist.

6. The method of claim 1, further comprising performing a virus scan on a plurality of point-in-time images that are generated prior to the unsecure image, wherein the virus scan is performed on the plurality of point-in-time images in reverse time order in which the plurality of point-in-time images were generated, until a particular point-in-time image is determined by the virus scan to be the secure point-in-time image.

7. The method of claim 1, further comprising sending to a manager, by the agent resident in the virtual machine which runs on the host, report information whenever the monitoring process determines that the monitored operational behavior is compliant with the expected operational behavior, wherein the manager uses the report information to identify times that correspond to secure point-in-time images.

8. A non-transitory computer-readable medium having instructions stored thereon, which in response to execution by one or more processors, cause the one or more processors to perform or control performance of operations for a host in a virtualized computing environment to restore a virtual machine supported by the host, the operations comprising:

performing, by a replication module resident in the virtual machine which runs on the host, a replication process during continuous data protection (CDP) to store point-in-time images of the virtual machine at a storage location over time while the virtual machine is running on the host, wherein the storage location is at a remote data recovery (DR) site that is external to the virtualized computing environment that includes the host;

performing, by an agent resident in the virtual machine which runs on the host, a monitoring process concurrently and in synchronization with the replication process to monitor operational behavior of the virtual machine running on the host;

in response to the monitored operational behavior at a particular time being determined by the agent as being in violation of expected operational behavior of the virtual machine, identifying, by the replication module resident in the virtual machine which runs on the host, a point-in-time image of the virtual machine that corresponds to the particular time as an unsecure image with a security risk;

performing an action on the unsecure image to restrict use of the unsecure image for restoration of the virtual machine; and recovering, from the storage location at the DR site, a point-in-time image of the virtual machine that was generated prior to the particular time and generated while the virtual machine was running on the host, that was stored at the storage location at the DR site by the replication process during CDP, and that was determined as being secure at the point-in-time of the generation of the image, to use for the restoration of the virtual machine.

9. The non-transitory computer-readable medium of claim 8, wherein performing the action on the unsecure image includes at least one of: discarding the unsecure image or performing a virus scan on the unsecure image.

10. The non-transitory computer-readable medium of claim 8, wherein the operations further comprise:

restricting use of at least one point-in-time image, generated after the unsecure image, for restoration of the virtual machine.

11. The non-transitory computer-readable medium of claim 8, wherein the operations further comprise:

generating and sending to a manager, by the agent resident in the virtual machine which runs on the host, an alarm to indicate that the monitored operational behavior is in violation of the expected operational behavior; and receiving, by the host, a remediation instruction from the manager, in response to the manager having verified from at least the alarm that the virtual machine is infected with malicious code, wherein the point-in-time image is identified as the unsecure image based on the particular time which is indicated in the received remediation instruction.

12. The non-transitory computer-readable medium of claim 8, wherein performing the monitoring process includes comparing, by the agent resident in the virtual machine which runs on the host, one or more operations performed by the virtual machine against a whitelist for compliance with operations identified in the whitelist.

13. The non-transitory computer-readable medium of claim 8, wherein the operations further comprise:

performing a virus scan on a plurality of point-in-time images that are generated prior to the unsecure image, wherein the virus scan is performed on the plurality of point-in-time images in reverse time order in which the plurality of point-in-time images were generated, until a particular point-in-time image is determined by the virus scan to be the secure point-in-time image.

14. The non-transitory computer-readable medium of claim 13, wherein the operations further comprise:
    sending to a manager, by the agent resident in the virtual machine which runs on the host, report information whenever the monitoring process determines that the monitored operational behavior is compliant with the expected operational behavior, wherein the manager uses the report information to identify times that correspond to secure point-in-time images.

15. A host in a virtualized computing environment, the host comprising:
    a processor; and
    a non-transitory computer-readable medium coupled to the processor and having instructions stored thereon, which in response to execution by the processor, cause the processor to perform or control performance of operations for the host to restore a virtual machine supported by the host, wherein the operations include:
        perform, by a replication module resident in the virtual machine which runs on the host, a replication process during continuous data protection (CDP) to store point-in-time images of the virtual machine at a storage location over time while the virtual machine is running on the host, wherein the storage location is at a remote data recovery (DR) site that is external to the virtualized computing environment that includes the host;
        perform, by an agent resident in the virtual machine which runs on the host, a monitoring process concurrently and in synchronization with the replication process to monitor operational behavior of the virtual machine running on the host;
        in response to the monitored operational behavior at a particular time being determined by the agent as being in violation of expected operational behavior of the virtual machine, identify, by the replication module resident in the virtual machine which runs on the host, a point-in-time image of the virtual machine that corresponds to the particular time as an unsecure image with a security risk;
        perform an action on the unsecure image to restrict use of the unsecure image for restoration of the virtual machine; and
        recover, from the storage location at the DR site, a point-in-time image of the virtual machine that was generated prior to the particular time and generated while the virtual machine was running on the host, that was stored at the storage location at the DR site by the replication process during CDP, and that was determined as being secure at the point-in-time of the generation of the image, to use for the restoration of the virtual machine.

16. The host of claim 15, wherein the operation to perform the action on the unsecure image includes at least one operation to: discard the unsecure image or perform a virus scan on the unsecure image.

17. The host of claim 15, wherein the operations further include:
    restrict use of at least one point-in-time image, generated after the unsecure image, for restoration of the virtual machine.

18. The host of claim 15, wherein the operations further comprise:
    generate and send to a manager, by the agent resident in the virtual machine which runs on the host, an alarm to indicate that the monitored operational behavior is in violation of the expected operational behavior; and
    receive, by the host, a remediation instruction from the manager, in response to the manager having verified from at least the alarm that the virtual machine is infected with malicious code, wherein the point-in-time image is identified as the unsecure image based on the particular time which is indicated in the received remediation instruction.

19. The host of claim 15, wherein performance of the monitoring process includes comparison, by the agent resident in the virtual machine which runs on the host, one or more operations performed by the virtual machine against a whitelist for compliance with operations identified in the whitelist.

20. The host of claim 15, wherein the operations further comprise:
    perform a virus scan on a plurality of point-in-time images that are generated prior to the unsecure image, wherein the virus scan is performed on the plurality of point-in-time images in reverse time order in which the plurality of point-in-time images were generated, until a particular point-in-time image is determined by the virus scan to be the secure point-in-time image.

21. The host of claim 15, wherein the operations further comprise:
    send to a manager, by the agent resident in the virtual machine which runs on the host, report information whenever the monitoring process determines that the monitored operational behavior is compliant with the expected operational behavior, wherein the manager uses the report information to identify times that correspond to secure point-in-time images.

* * * * *